(12) United States Patent
Albrecht et al.

(10) Patent No.: US 7,652,839 B2
(45) Date of Patent: *Jan. 26, 2010

(54) MAGNETIC RECORDING DISK WITH IDENTICAL SERVO PATTERNS FORMED ON EACH DISK SURFACE BY SINGLE MASTER TEMPLATE AND DISK DRIVE USING THE DISK

(75) Inventors: Thomas R. Albrecht, San Jose, CA (US); Zvonimir Z. Bandic, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 356 days.

This patent is subject to a terminal disclaimer.

(21) Appl. No.: 11/740,289

(22) Filed: Apr. 26, 2007

(65) Prior Publication Data

US 2008/0266701 A1    Oct. 30, 2008

(51) Int. Cl.
    *G11B 21/02* (2006.01)
(52) U.S. Cl. .................... 360/75; 360/48; 360/135
(58) Field of Classification Search ............... None
    See application file for complete search history.

(56) References Cited

U.S. PATENT DOCUMENTS

| | | | |
|---|---|---|---|
| 4,912,585 A | 3/1990 | Belser et al. | |
| 5,689,384 A | 11/1997 | Albrecht et al. | |
| 5,923,272 A | 7/1999 | Albrecht et al. | |
| 5,926,337 A | 7/1999 | Itou et al. | |
| 5,930,065 A | 7/1999 | Albrecht et al. | |
| 6,018,512 A * | 1/2000 | Belser | 369/281 |
| 6,144,517 A | 11/2000 | Watanabe et al. | |
| 6,347,016 B1 | 2/2002 | Ishida et al. | |
| 6,433,944 B1 | 8/2002 | Nagao et al. | |
| 6,538,835 B1 | 3/2003 | Burton | |
| 6,754,032 B1 | 6/2004 | Szita et al. | |
| 6,791,774 B1 | 9/2004 | Albrecht et al. | |
| 6,798,590 B2 | 9/2004 | Albrecht et al. | |
| 7,027,246 B2 * | 4/2006 | Valeri | 360/48 |
| 7,046,476 B1 | 5/2006 | Albrecht et al. | |
| 7,061,702 B2 | 6/2006 | Yoshimura et al. | |
| 7,092,183 B2 | 8/2006 | Ehrlich | |
| 2004/0100719 A1 * | 5/2004 | Wilson et al. | 360/75 |
| 2006/0012903 A1 * | 1/2006 | Asakura et al. | 360/48 |
| 2006/0012904 A1 | 1/2006 | Naruse et al. | |
| 2006/0279871 A1 | 12/2006 | Albrecht et al. | |

OTHER PUBLICATIONS

Ishida, T. et al., "Magnetic Printing Technology-Application to HDD", IEEE Transactions on Magnetics, vol. 39, No. 2, Mar. 2003, pp. 628-632.
Bandic et al., "Magnetic lithography for servowriting applications using flexible magnetic masks nanofabricated on plastic substrates", Microsystems Technology, DOI 10.1007/s00542-006-0287-8.
Bandic et al., "Patterned magnetic media: impact of nanoscale patterning on hard disk drives", Solid State Technology S7+ Suppl. S, Sep. 2006.
Terris et al., "Topical Review: Nanofabricated and self-assembled magnetic structures as data storage media", J. Phys. D: Appl. Phys. 38 (2005) R199-R222.

* cited by examiner

*Primary Examiner*—Jason C Olson
(74) *Attorney, Agent, or Firm*—Thomas R. Berthold (57) ABSTRACT

A magnetic recording disk in a disk drive has identical prepatterned servo patterns on its front and back surfaces. The servo patterns on each disk surface are pre-patterned with a single master template, resulting in the identical pattern on each disk surface. The servo sectors on the two disk surfaces can form identical patterns of angularly spaced arcuate-shaped lines or straight lines that extend radially across the data tracks. However, because the lines on at least one of the disk surfaces do not replicate the path of the recording head, the sampling rate of the servo sectors on that surface is not constant but varies with radial position of the head. To accommodate this, the disk drive's servo control system calculates a timing adjustment from an estimate of the radial position of the head and uses this timing adjustment to adjust the time to open a time window to allow detection of the servo sectors.

18 Claims, 8 Drawing Sheets

MAGNETIC RECORDING DISK WITH IDENTICAL SERVO PATTERNS FORMED ON EACH DISK SURFACE BY SINGLE MASTER TEMPLATE AND DISK DRIVE USING THE DISK

BACKGROUND OF THE INVENTION

1. Field of the Invention

This invention relates generally to a magnetic recording disk with pre-patterned servo patterns formed with a master template, and a magnetic recording disk drive having a servo control system operable with the servo patterns.

2. Description of the Related Art

Conventional magnetic recording hard disk drives use either horizontal recording wherein the magnetized regions that define the magnetically recorded data bits are oriented in the plane of the recording layer on the hard disks, or perpendicular recording wherein the magnetized regions are oriented perpendicular to the plane of the recording layer. Each recording surface on the disks is a continuous layer of magnetic material that becomes formed into concentric data tracks containing the magnetically recorded data bits when the recording head writes on the magnetic material. Each disk surface also includes a fixed, pre-recorded pattern of servo sectors that can not be written over by the recording heads and that are used to position the heads to the desired data tracks and maintain the heads on the data tracks.

The conventional method of generating the pattern of servo sectors is by "servo-writing" the pattern on a track-by-track basis, either with a special write head and servo-writer or with the production recording head in the disk drive. Because this is a time-consuming and therefore expensive process, other methods for generating the servo patterns have been proposed.

In contact magnetic duplication or transfer (CMT), sometimes referred to as magnetic printing or magnetic lithography (ML), a "master" template is used that contains regions or islands of soft (low-coercivity) magnetic material in a pattern corresponding to the servo pattern that is to be transferred to the disk. The CMT master template is typically a rigid substrate or a rigid substrate with a plastic film formed on it, as described in U.S. Pat. Nos. 6,347,016 B1 and 6,433,944 B1; and by Ishida, T. et al., "Magnetic Printing Technology-Application to HDD", *IEEE Transactions on Magnetics,* Vol 39, No. 2, March 2003, pp 628-632. U.S. Pat. No. 6,791,774 B1, assigned to the same assignee as this application, describes a CMT template and process for forming servo patterns in perpendicular magnetic recording disks. Magnetic lithography (ML) using a flexible master template is described in U.S. Pat. No. 6,798,590 B2, assigned to the same assignee as this application, and by Bandic et al., "Magnetic lithography for servowriting applications using flexible magnetic masks nanofabricated on plastic substrates", *Microsystems Technology,* DOI 10.1007/s00542-006-0287-8.

The CMT process for forming servo patterns is applicable not only to conventional "continuous" magnetic media wherein the concentric data tracks are formed in the continuous layer of magnetic material by the recording heads, but also to "discrete track" media. In this type of media, as described for example in U.S. Pat. No. 4,912,585, each data track consists of continuous magnetic material, but the individual data tracks are separated by nonmagnetic guard bands. The CMT process may be used to form not only the servo patterns but also the discrete tracks.

Patterned magnetic media has been proposed to replace conventional continuous magnetic media to increase the data storage density in disk drives. In patterned media the magnetic material on the disk surface is patterned into small isolated data islands such that there is a single magnetic domain in each island or "bit". To produce the required magnetic isolation of the patterned data islands, the magnetic moment of the regions between the islands must be destroyed or substantially reduced so as to render these regions essentially nonmagnetic. Alternatively, the patterned media may be fabricated so that that there is no magnetic material in the regions between the islands. Patterned media can be produced by replication from a master template via nanoimprinting. The nanoimprinting process forms not only the isolated data islands in the data tracks, but also the servo patterns. In nanoimprinting a master mold or template replicates a topographic pattern onto a polymeric resist coating on the disk substrate, followed by sputter deposition of magnetic material over the pattern. Nanoimprinting of patterned media is described by Bandic et al., "Patterned magnetic media: impact of nanoscale patterning on hard disk drives", *Solid State Technology* S7+*Suppl. S, SEPTEMBER* 2006; and by Terris et al., "TOPICAL REVIEW: Nanofabricated and self-assembled magnetic structures as data storage media", *J. Phys. D: Appl. Phys.* 38 (2005) R199-R222.

In hard disk drives, the servo pattern on the back surface of the disks is not identical to, but is rather the mirror image of, the servo pattern on the front surface of the disks. Thus, to form servo patterns by either CMT or nanoimprinting, it is necessary to fabricate two master templates, one for the front surfaces of the disks and one for the back surfaces of the disks. This doubles the time and cost to fabricate the master templates. In the case of nanoimprinting, the master template can be very expensive and require several days to fabricate because it is typically generated by relatively costly and slow e-beam lithography equipment.

What is needed is a magnetic recording disk with identical servo patterns on front and back surfaces, and a disk drive with a servo control system that can operate with the identical servo patterns, so that a single master template can be used to form the servo patterns on both sides of the disk.

SUMMARY OF THE INVENTION

The invention is a magnetic recording disk with identical pre-patterned servo patterns on its front and back surfaces and a disk drive with a servo control system that can operate with the identical servo patterns. The servo patterns on each disk surface are pre-patterned with a single master template, resulting in the identical pattern on each disk surface. In a first embodiment, the servo sectors on the two disk surfaces can form identical patterns of angularly spaced arcuate-shaped lines that extend generally radially across the data tracks. The arcuate-shaped lines on one surface, e.g., the front surface, generally replicate the path of the recording head as it is moved across the data tracks by the rotary actuator, so that there is a constant sampling rate of the servo sectors on the front surface regardless of radial position of the head. However, the arcuate-shaped lines on the other surface, i.e., the back surface, do not replicate the path of the recording head so the servo sampling rate is not constant but varies with radial position of the head. Thus when the servo control system is operating from servo sectors on the back surface, the servo control processor calculates a timing adjustment from an estimate of the radial position of the head. This timing adjustment is then used to adjust the time to open a time window to allow detection of the servo sectors on the back surface.

In a second embodiment, the servo sectors on the two disk surfaces can form identical patterns of angularly spaced straight lines that extend radially across the data tracks. The straight radial lines do not replicate the path of the recording head on either surface, so the servo sampling rate is not constant but varies with radial position of the head on each surface. Thus when the servo control system is operating from servo sectors on either surface, the servo control processor calculates a timing adjustment from an estimate of the radial position of the head. This timing adjustment, which is one-half the timing adjustment required for the first embodiment, is then used to adjust the time to open a time window to allow detection of the servo sectors on each surface.

Because the front and back surfaces have identical servo patterns, the order of the servo fields in the servo sectors on the back surface will be the reverse of the order on the first surface. In one embodiment, there is no change to the servo fields, so the servo fields on the back surface are read in the opposite order, stored in memory and then decoded. In another embodiment servo sectors with substantially symmetric servo fields are used, so the order in which the servo fields is read is the same for the front and back surfaces.

For a fuller understanding of the nature and advantages of the present invention, reference should be made to the following detailed description taken together with the accompanying figures.

DETAILED DESCRIPTION OF THE INVENTION

Figure 1:
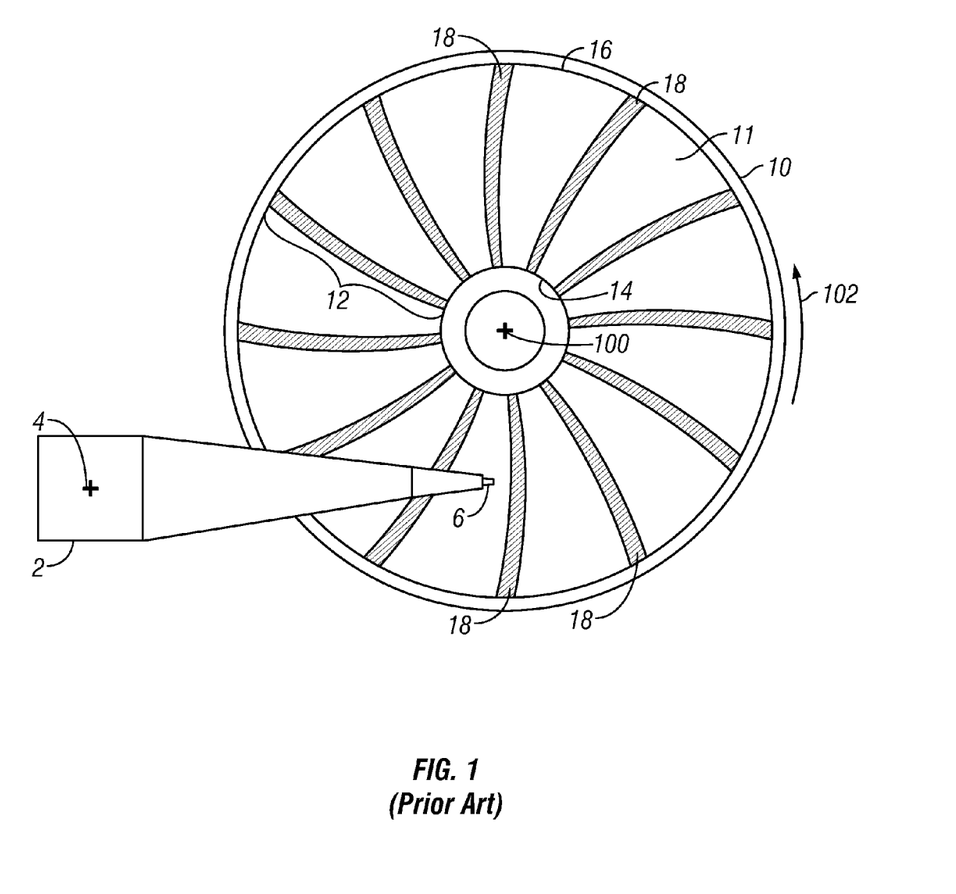
FIG. 1 is a schematic of a disk drive with a rotary actuator and a rigid magnetic recording disk having pre-patterned servo sectors formed on a first or "front" surface.

FIG. 1 illustrates a disk drive with a rotary actuator 2 and a rigid magnetic recording disk 10 having pre-patterned servo sectors 18 formed on a first or "front" surface 11. The disk 10 rotates in the direction 102 about a central axis 100. The front surface 11 has an annular data band 12 which is defined by an inside diameter (ID) 14 and an outside diameter (OD) 16. The portions of the data band between the servo sectors 18 are used for the storage of user data and contain circular data tracks, with each data track being typically divided into physical data sectors. The rotary actuator 2 rotates about pivot 4 and supports a read/write head 6 at its end. As the actuator 2 rotates, the head 6 follows a generally arcuate path between ID 14 and OD 16.

The servo sectors 18 are not formed by conventional servowriting but by a patterning process using a master template. In contact magnetic transfer (CMT), also called magnetic lithography (ML), a magnetic mask serves as the master template. In nanoimprinting a master template replicates a topographic pattern onto a polymeric resist coating on the disk substrate, followed by sputter deposition of magnetic material over the pattern. The servo sectors 18 form a pattern of angularly spaced arcuate lines that extend generally radially from ID 14 to OD 16. The arcuate shape of the servo sectors matches the arcuate path of head 6. During operation of the disk drive, the head 6 reads or writes data on a selected one of a number of concentric circular data tracks located between the ID 14 and OD 16 of the annular data band 12. To accurately read or write data from a selected track, the head 6 is required to be maintained over the centerline of the track. Accordingly, each time one of the servo sectors 18 passes beneath the head 6, the head 6 detects discrete magnetized servo blocks in the position error signal (PES) field in the servo sector. A PES is generated and used by the disk drive's head positioning control system to move the head 6 towards the track centerline. Thus, during a complete rotation of the disk 10, the head 6 is continually maintained over the track centerline by servo information from the servo blocks in successive angularly spaced servo sectors 18.

Figure 2:
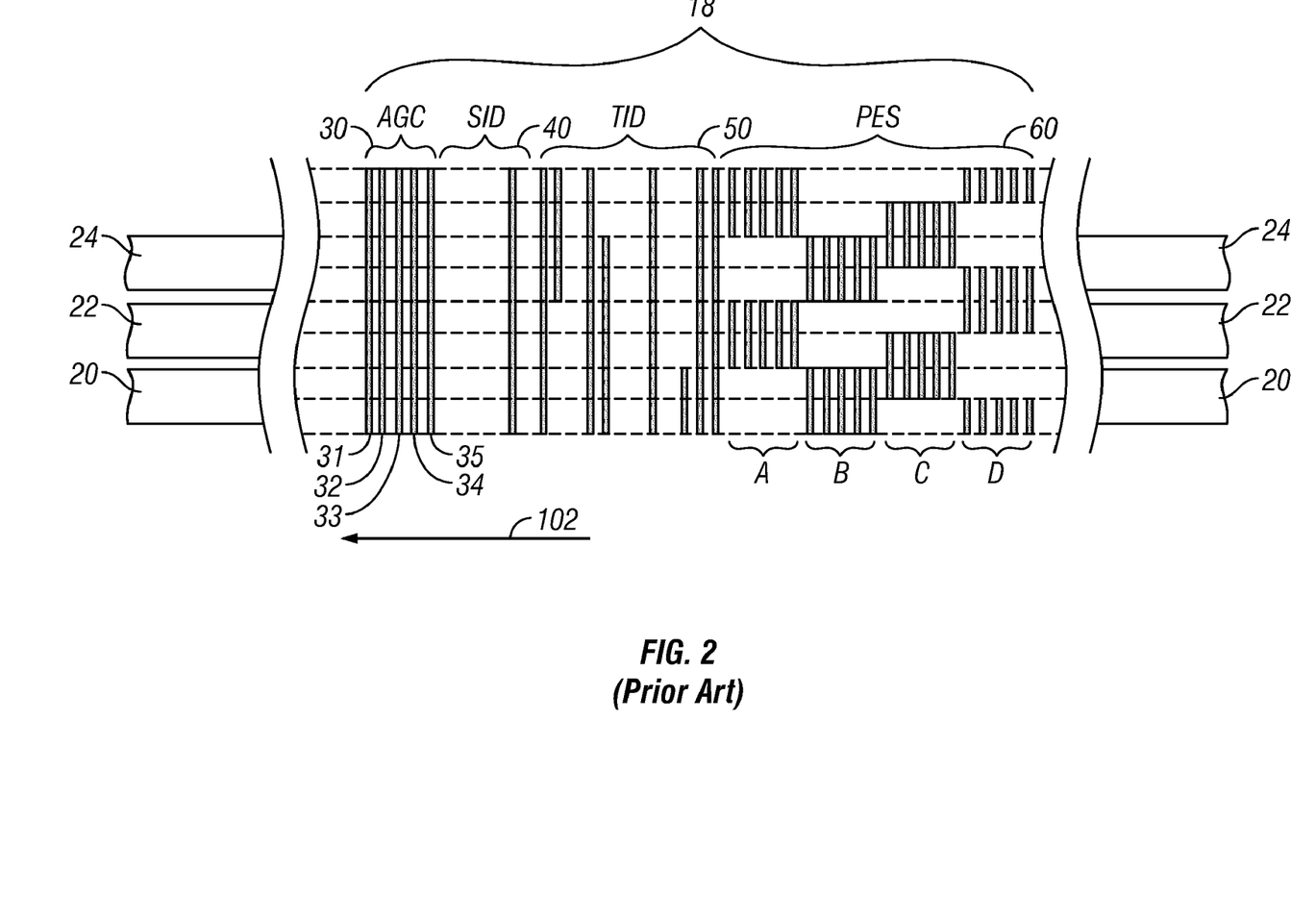
FIG. 2 is an expanded view of a portion of a typical servo sector and portions of three data tracks of the disk shown in FIG. 1.

An expanded top view of a typical servo sector 18 and portions of three data tracks is shown in FIG. 2. The three data tracks 20, 22, 24 are shown in outline. If the disk 10 is the type with a continuous layer of magnetic recording material in the data portions of surface 11, then the tracks 20, 22, 24 are continuous tracks whose radial width is defined generally by the head 6 when it records on the continuous recording layer. If the disk 10 is the type with discrete tracks, then the tracks 20, 22, 24 would contain continuous recording material along the tracks but the tracks would be separated from each other by nonmagnetic guard bands. If the disk 10 is the type with patterned media, then the tracks 20, 22, 24 would each contain discrete islands of magnetizable material.

All of the shaded portions of FIG. 2 represent discrete servo blocks magnetized in the same direction. They may all be magnetized in the same direction horizontally, i.e., in the plane parallel to the plane of the paper in FIG. 2, if the disk drive is designed for longitudinal or horizontal magnetic recording, or perpendicularly, i.e., into or out of the plane of the paper, if the disk drive is for perpendicular magnetic recording. It is also possible that every other shaded region in FIG. 2 might have opposite polarity, with the unshaded regions being nonmagnetic, which improves the signal quality of the servo pattern, as described in application Ser. No. 11/149,028, published as US20060279871 A1 and assigned to the same assignee as this application. If the servo sectors 18 are formed by CMT then the non-shaded portions of FIG. 2 represent regions that are magnetized in the opposite direction from the magnetization of the servo blocks because they retain this opposite magnetization from a DC magnetization process prior to the CMT process. If the servo sectors 18 are formed by nanoimprinting then the non-shaded portions of FIG. 2 represent nonmagnetic regions, i.e. either regions of nonmagnetic material or regions of magnetic material generally incapable of being magnetized by the write head.

The servo blocks that make up servo sector 18 are arranged in fields 30, 40, 50 and 60, as shown in FIG. 2. Servo field 30 is an automatic gain control (AGC) field of blocks 31-35 that are used to measure the amplitude of the signal and adjust the provide gain for the subsequently read servo blocks. Servo field 40 is sector identification (SID) field, also called a servo timing mark or STM field, to provide a timing mark to establish start/stop timing windows for subsequent servo blocks.

Servo field 50 is a track identification (TID), also called the cylinder or CYL field because the tracks from all of the disk surfaces in a disk drive with a multiple stacked disks from a "cylinder" of tracks. The TID field 50 contains the track number, typically Gray-coded, and determines the integer part of the radial position. Servo field 60 is the position error signal (PES) field, which in this example contain A, B, C, D subfields of servo blocks as part of the well-known "quad-burst" PES pattern, and are used to determine the fractional part of the radial position.

Figure 3:
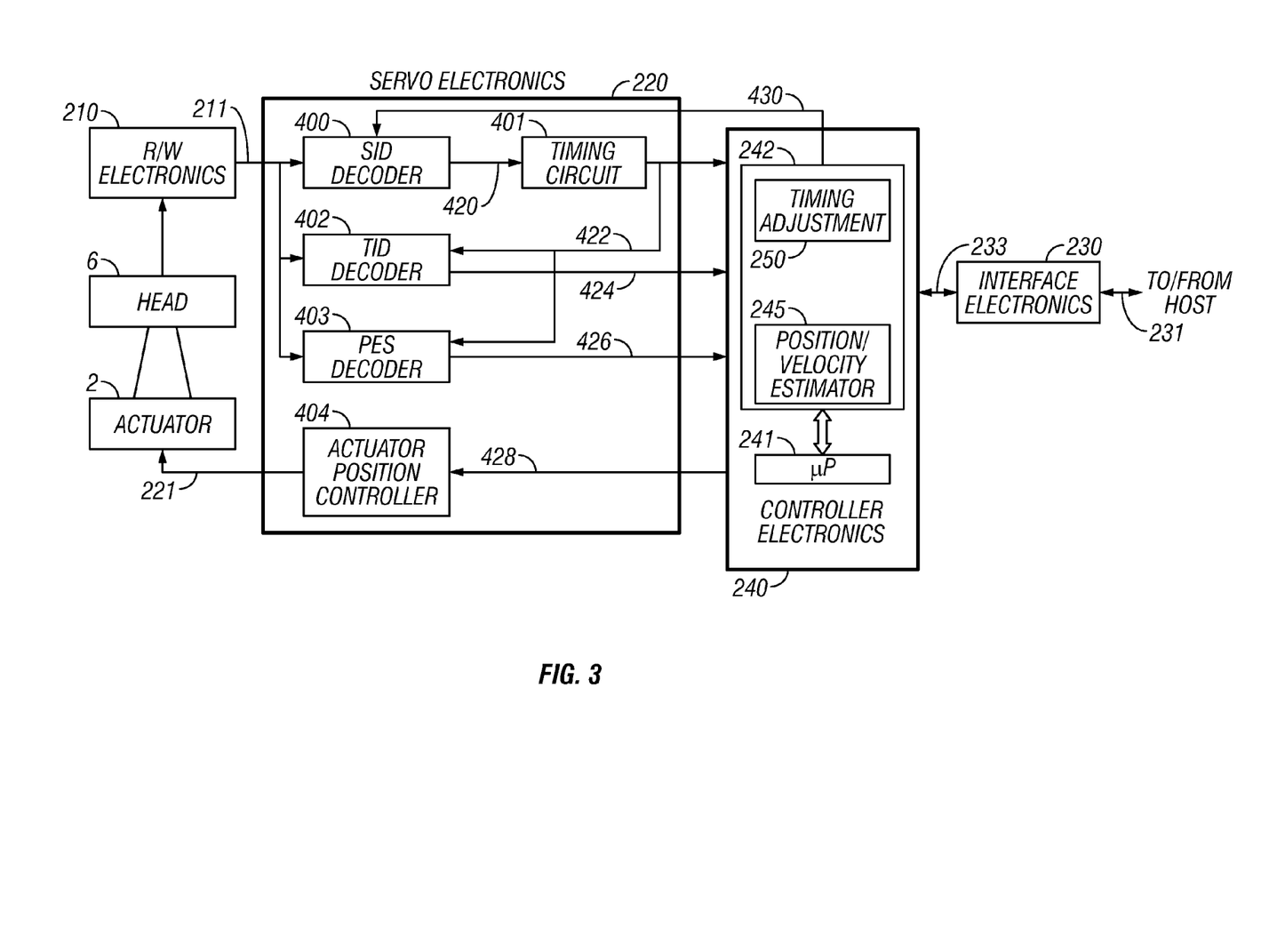
FIG. 3 is a block diagram of a disk drive servo control system showing the modification for use with this invention.

FIG. 3 is a block diagram of the disk drive servo control system and illustrates the read/write electronics 210, servo electronics 220, interface electronics 230, and controller electronics 240. Read/write electronics 210 receives signals from head 6, passes servo information from the servo sectors to servo electronics 220, and passes data signals to controller electronics 240. Servo electronics 220 uses the servo information to produce a signal at 221 which drives actuator 2 to position the head 6. Interface electronics 230 communicates with a host system (not shown) over interface 231, passing data and command information, including requests from the host system for reading from or writing to the data sectors of disk 10. Interface electronics 230 communicates with controller electronics 240 over interface 233.

Controller electronics 240 includes a microprocessor 241 and associated memory 242 with stored computer programs for executing various algorithms, including the control algorithm. The control algorithm uses a set of parameters stored in memory 242 and based on the static and dynamic characteristics of the actuator 2. The control algorithm is essentially a matrix multiplication algorithm, and the parameters are coefficients used in the multiplication.

Controller electronics 240 receives a list of requested data sectors from interface electronics 230 and converts them into cylinder (i.e., track), head, and data sector numbers which uniquely identify the physical location of the desired data sectors on disk 10. The head and cylinder numbers are passed to servo electronics 220, which positions head 6 over the appropriate data sector on the appropriate cylinder. If the cylinder number provided to servo electronics 220 is not the same as the cylinder number over which head 6 is presently positioned, servo electronics 220 first executes a "seek" operation to move the head 6 from its present cylinder to the desired cylinder.

The servo electronics 220 first begins executing sector computations to locate and identify the desired data sector. As servo sectors pass under head 6, each servo sector is detected. In brief, the SID is used to locate servo sectors, and a count of SIDs from a servo sector containing an index mark uniquely identifies each servo sector. SID decoder 400 receives a control input 430 from the controller electronics 240 that opens a time window for detection of the next SID. SID decoder 400 then receives a clocked data stream 211 as input from the read/write electronics 210. Once a SID has been detected, a SID found signal 420 is generated. The SID found signal 420 is used to adjust timing circuit 401, which controls the operating sequence for the remainder of the servo sector. After detection of a SID, the track identification (TID) decoder 402 receives timing information 422 from timing circuit 401, reads the signals generated by TID field 50 (FIG. 2), and then passes the decoded TID information 424 to controller electronics 240. During a seek operation the controller electronics 240 uses the TID information to estimate the position and velocity of the head from a stored program of instructions represented as position and velocity estimator 245.

Once servo electronics 220 has positioned head 6 over the appropriate cylinder, the servo fields are read by the head 6 and read/write electronics 210 inputs signals 211 to the servo electronics 220. Subsequently, PES decoder 403 captures the signals from PES field 60 (FIG. 2), then passes the PES 426 to controller electronics 240. Controller electronics 240 uses the PES as input to a control algorithm to calculate the signal 428 to actuator position controller 404 to maintain the head 6 on the centerline of the desired track.

Referring again to FIG. 1, it can be seen that the servo sectors 18 are shaped as an arc whose center of whose center of rotation is the pivot 4 of actuator 2. This arcuate shape for the servo sectors assures that the time interval between successive sector sectors passing the head remains fixed, regardless of which track the head is on. This simplifies the design and operation of the head-positioning servo system because a constant servo sampling rate is achieved regardless of head motion.

Figure 4A:
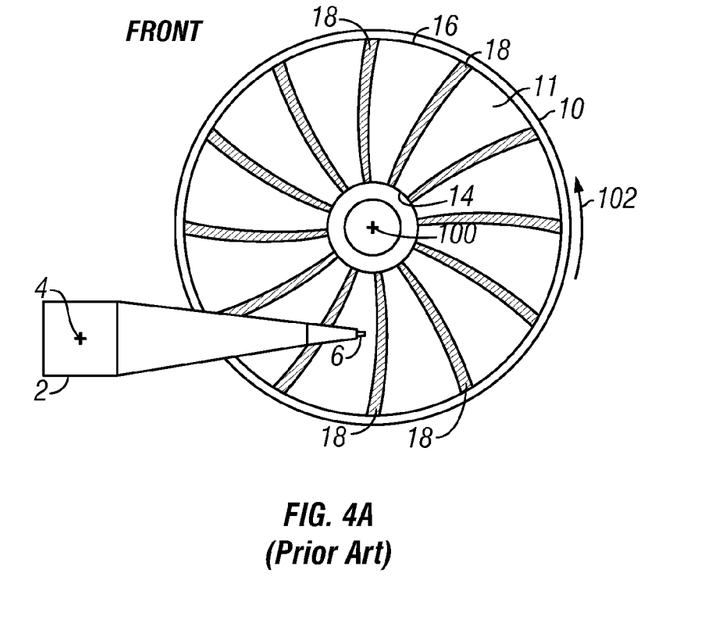
FIGS. 4A and 4B show the comparison of the servo patterns on the front (FIG. 4A) and back (FIG. 4B) surfaces of a prior art disk.
Figure 4B:
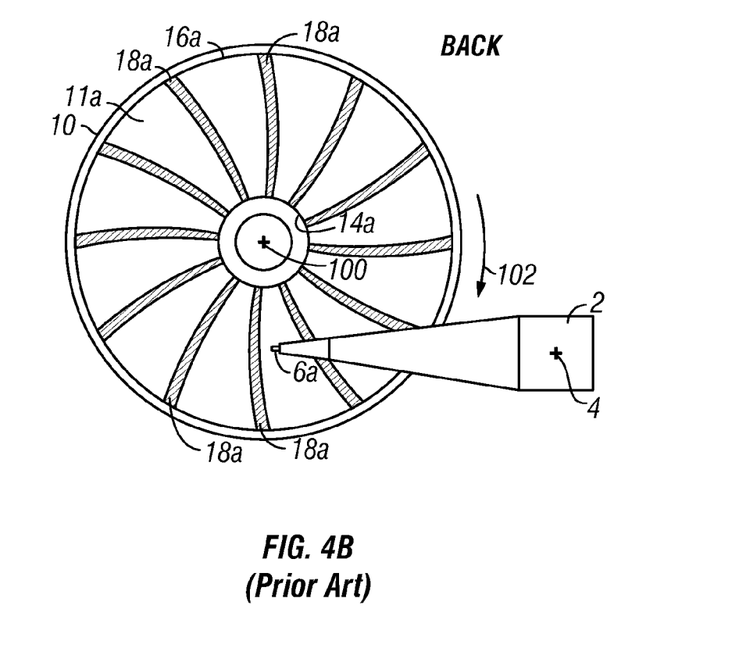

However, this requirement for the shape of the servo sectors means that the second or "back" surface of each disk must be the mirror image of the first or front surface. This also assures that the order of the servo fields (FIG. 2) detected by the head is the same for each disk surface so that no modification of the servo control system is required. FIGS. 4A and 4B show the comparison of the front surface 11 (FIG. 4A) and back surface 11a (FIG. 4B) of a prior art disk 10 as the disk rotates in the direction 102. A comparison of the direction of curvature of the arcuate servo sectors 18 (FIG. 4A) with the direction of curvature of the arcuate servo sectors 18a (FIG. 4B) shows that the two servo patterns are not identical, but mirror images of one another. Thus the master template used to pattern servo sectors 18a on back surface 11a must be the mirror image of the master template used to pattern servo sectors 18 on front surface 11. However, this requires that two different master templates must be fabricated and used to form the servo patterns for a single disk.

Figure 5A:
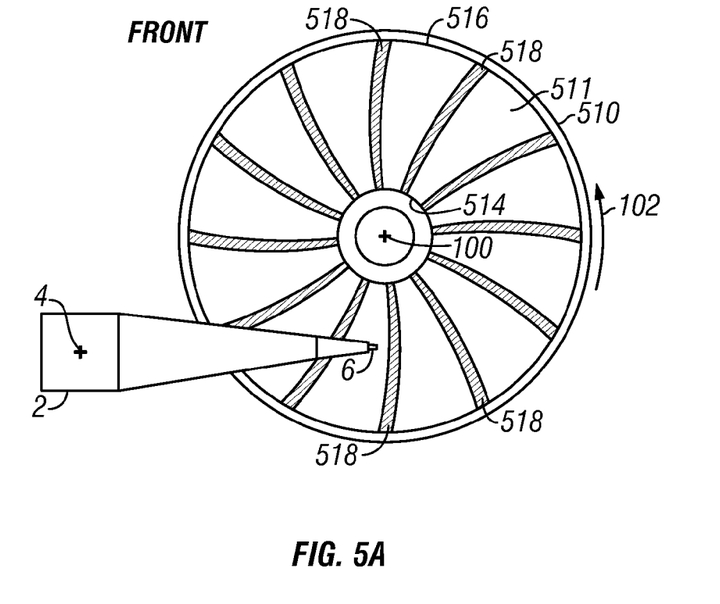
FIGS. 5A and 5B show the identical servo patterns of the front surface (FIG. 5A) and back surface (FIG. 5B) of one embodiment of a disk according to this invention.
Figure 5B:
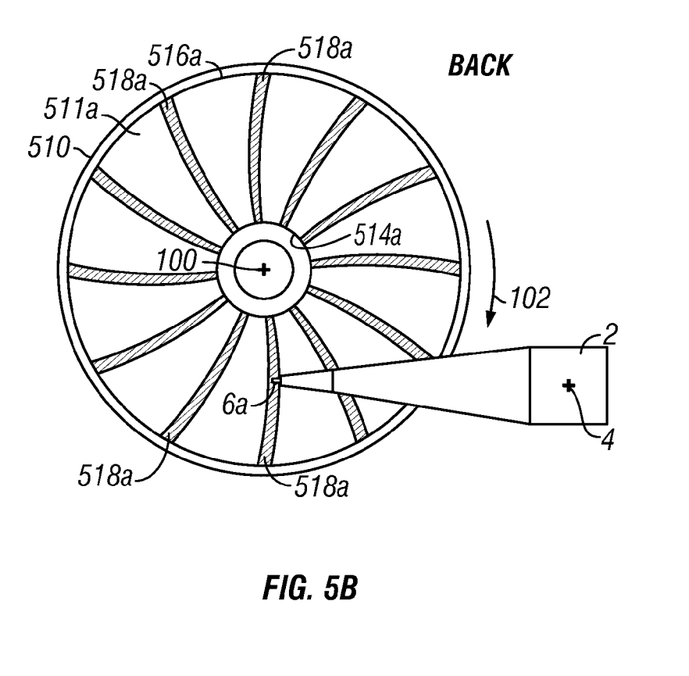

In this invention, a single master template is used for both disk surfaces, resulting in the front and back surfaces having identical servo patterns. FIGS. 5A and 5B show the identical servo patterns of the front surface 511 (FIG. 5A) and back surface 511a (FIG. 4B) of one embodiment of a disk 510 according to this invention. A comparison of the direction of curvature of the arcuate servo sectors 518 (FIG. 5A) with the direction of curvature of the arcuate servo sectors 518a (FIG. 5B) shows that the two servo patterns are identical. However, it is apparent that the servo sectors 518a on back surface 511a do not have a shape that follows the arc of actuator 2, so that a constant servo sample rate will not be achieved on surface 511a. Also, because the servo patterns on surfaces 511 and 511a are identical, the order of the servo fields detected by the head 6a on back surface 511a will be the reverse of the order of the servo fields detected by the head 6 on front surface 511. Thus, in this invention, the operation of the servo control system and/or the arrangement of the fields within the servo sectors are modified.

Figure 6:
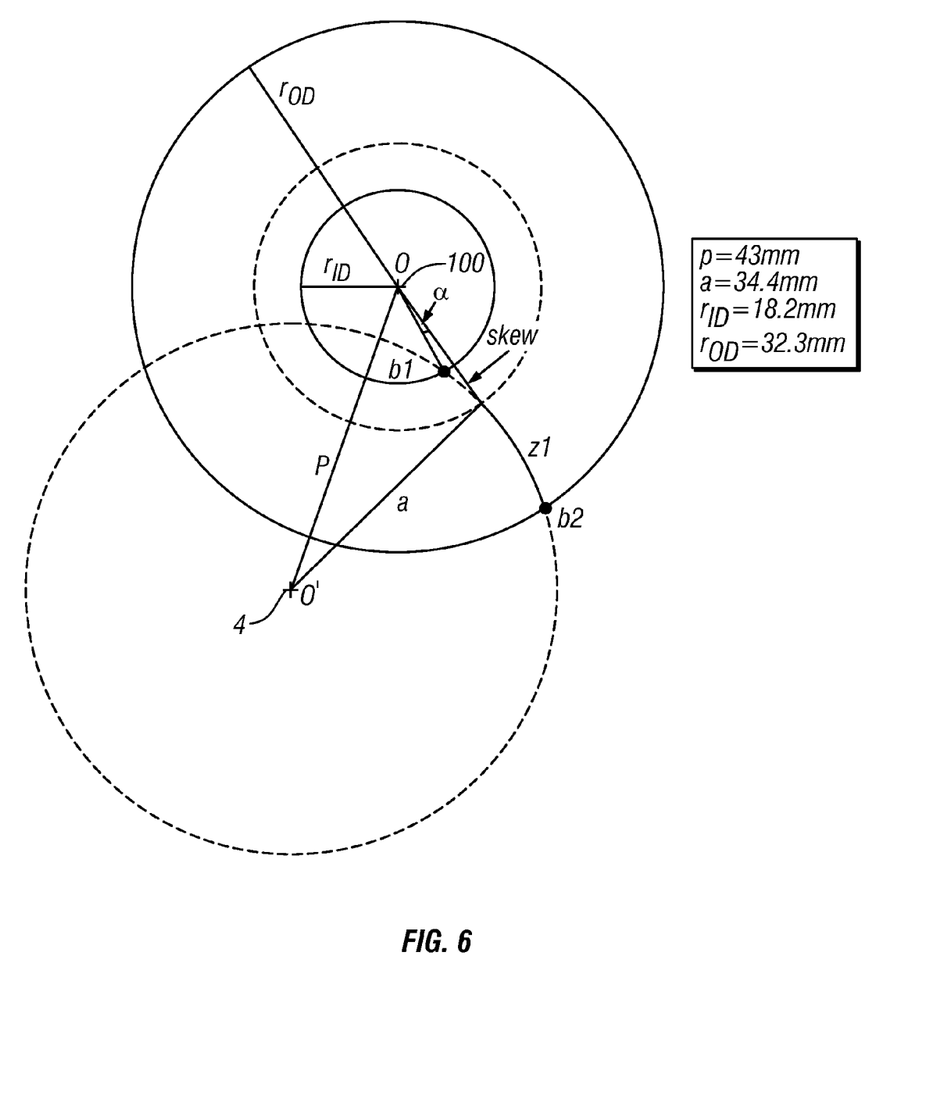
FIG. 6 is an illustration of typical disk drive geometry.

In this invention a timing adjustment for detection of the servo sectors is made to accommodate the pattern on back surface 511. This will be explained with the use of FIG. 6, which shows a typical disk drive geometry. The actuator is located at distance p between pivot 4 and disk central axis 100, and has an actuator length a, which is the distance from pivot 4 to the actuator tip RW where the head is located. The head on the tip of the actuator makes an arc or path Z1 across the disk from a point b1 at disk inner radius $r_{ID}$ to point b2 at disk outer radius $r_{OD}$. In this case conventional servo sectors 518 like those on front surface 511 will have curvature with radius a. It is straightforward to conclude from FIG. 6 that the "skew" angle as a function of radius is given by:

$$\alpha(r) = \arccos\frac{p^2 + r^2 - a^2}{2pr} - \arccos\frac{p^2 + r_{ID}^2 - a^2}{2pr_{ID}}$$

Because the head is fixed at the tip of the actuator, the magnetic transitions written by head are not collinear with the radius (or not orthogonal to the track direction). This is called head "skew". From the triangle (4-100-RW) the head skew is given by:

$$\text{skew} = 90 - \arccos\frac{a^2 + r^2 - p^2}{2ar}$$

Figure 7:
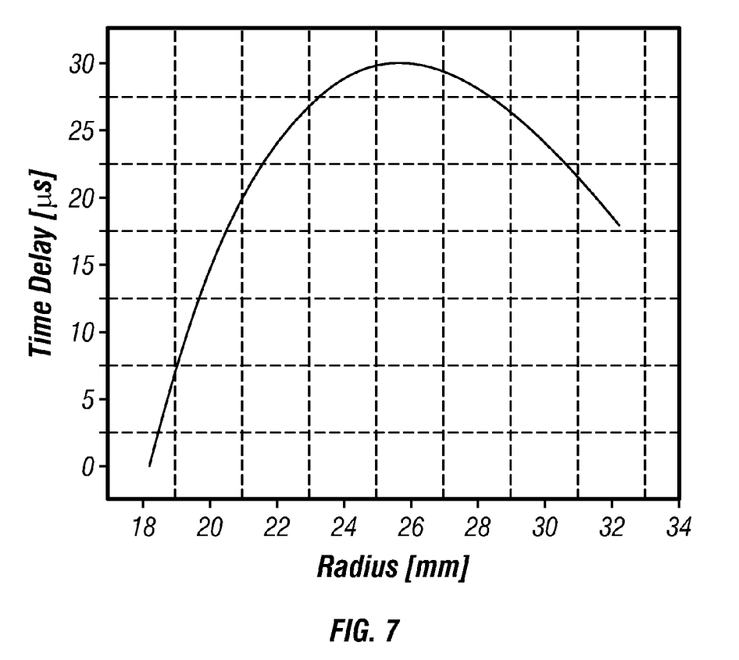
FIG. 7 is a graph of timing adjustment as a function of radius, relative to zero timing adjustment at the inner radius ($r_{ID}$), for a disk surface with straight-line servo sectors.

The time delay of the arcuate sector, when compared to a linear sector (the one that would result from drawing a straight line from b1 to b2) is given by:

$$\tau(r) = \frac{60}{rpm} \times \frac{\alpha(r)}{360°}$$

where the angle alpha is expressed in degrees. This timing adjustment is plotted in FIG. 7 as a function of radius, and relative to the timing adjustment at $r_{ID}$, which is assumed to be 0. FIG. 7 is generated based on the dimensions listed in FIG. 6 at a disk rpm of 15,000.

Thus in the first embodiment of this invention, like that shown in FIGS. 5A-5B, no timing adjustment is required when the servo control system is operating on front surface 511. However, a timing adjustment of twice that shown in FIG. 7 is introduced when the servo control system is operating on back surface 511a. The modification of the servo control system to accommodate the incorrect timing caused by the pattern on back surface 511a is shown in FIG. 3 as timing adjustment calculator 250, which is typically computer program instructions stored in memory 242. During a seek operation the timing adjustment between consecutive servo sectors changes because the radial position of the head is changing. The controller electronics 240 uses the estimated head position and velocity from estimator 245 to calculate the timing adjustment. The timing adjustment is calculated from either a lookup table or an equation generated from the data FIG. 7, using the radius (i.e., the cylinder) where the head is located, i.e., the estimated position of the head from estimator 245. The controller electronics 240 then uses this calculated timing adjustment to trigger SID decoder 400 to open the timing window for detection of the SID.

In a second embodiment, servo sectors may be generally radially-directed straight lines (between b1 and b2 in FIG. 6). Like in the first embodiment, the servo patterns are identical on front and back surfaces. However, in this embodiment, a timing adjustment like that shown in FIG. 7 is introduced when the servo control system is operating on each surface. For example, referring to FIG. 7, if a seek is required from radius 20 mm (timing adjustment relative to $r_{ID}$ is 15 μs) to radius 26 mm (timing adjustment=30 μs), a delay of 15 μs (30 μs–15 μs) is introduced.

In addition to the requirement for servo sector timing adjustment in this invention, because the front and back surfaces 511, 511a have identical servo patterns, the order of the servo fields detected by the head on surface 511a will be the reverse of the order on surface 511. There are several modifications of the servo control system to accommodate this. In one embodiment, there is no change to the servo fields, but the servo sectors on back surface 511a are read in the opposite order, i.e., PES, CYL, SID, AGC, and stored in memory. After the AGC is read and interpreted for servo signal amplitude, the SID is analyzed and timing is established. Even though the SID mark is time-reversed compared to expected, still the same correlation procedure used for front surface 511 may be used, with the exception that there is an accommodation for the inverted bit sequence. After timing is established, the CYL values are decoded (again taking into account the inverted sequence of bits), and the PES is decoded. In this embodiment there is a time delay on back surface 511a corresponding generally to the length of one servo sector because the servo sector is read and stored in memory before any calculations are performed by controller electronics 240.

Figure 8:
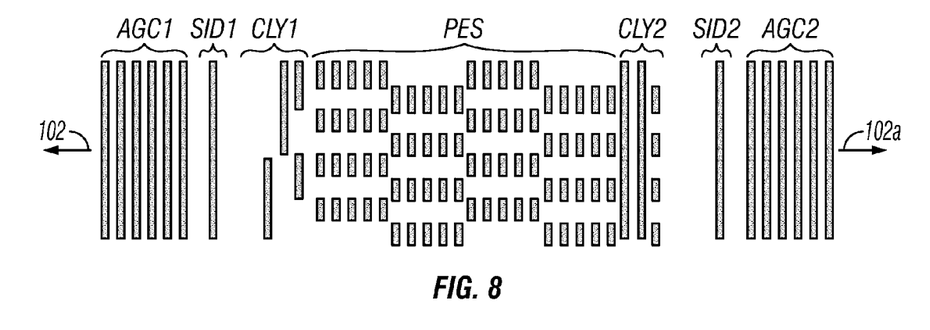
FIG. 8 is a view of a portion of a servo sector according to this invention with substantially symmetric servo fields.

In another embodiment servo sectors with substantially symmetric servo fields are used, as shown in FIG. 8. In the embodiment of FIG. 8, the order in which the servo fields is read is the same for the front and back surfaces. For example, for front surface 511 as shown in FIG. 5A, the servo fields would move in the direction indicated by arrow 102, while for back surface 511a as shown in FIG. 5B, the servo fields would move in the direction indicated by arrow 102a. The servo fields are substantially symmetric about the center of the servo sector. The PES field is located in the center of the servo sector, with the CYL code distributed as CYL1 and CYL2 on opposite ends of the PES field. The complete CYL field normally contains m bits that contain actual track information and n error correction code (ECC) bits, where typically m and n have similar values. For the symmetric format of FIG. 8, the CYL field is split into two subfields (CL1 and CYL2). CYL1 and CYL2 may each provide partial information about the cylinder number, whereas both are needed to obtain accurate track number involving ECC as well. For example, CYL1 and CYL2 can each have m+n/2 bits. This allows enough information for long seeks. Identical AGC fields AGC1 and AGC2) are located at each end of the servo sector, and identical SID fields (SID1 and SID2) are located between respective AGC and CYL fields. In the servo sector format shown in FIG. 8, the additional disk surface "overhead" is for the second SID field as well as the extra m bits of the second CYL field. In a typical servo system, for example 140 servo sectors angularly spaced around each disk surface, this would result in approximately 16 bits of overhead for having two CYL fields (assuming no ECC) and about 12-16 bits for the second SID field. A typical servo sector may have approximately 40 bits of AGC, 12 bits of SID, 32 bits of track code, 12 bits of sector code and 48 bits of PES code, for total of approximately 144 bits. The additional 28-32 bits is thus approximately a 20% increase in servo overhead over the conventional servo pattern (FIG. 2).

Figure 9:
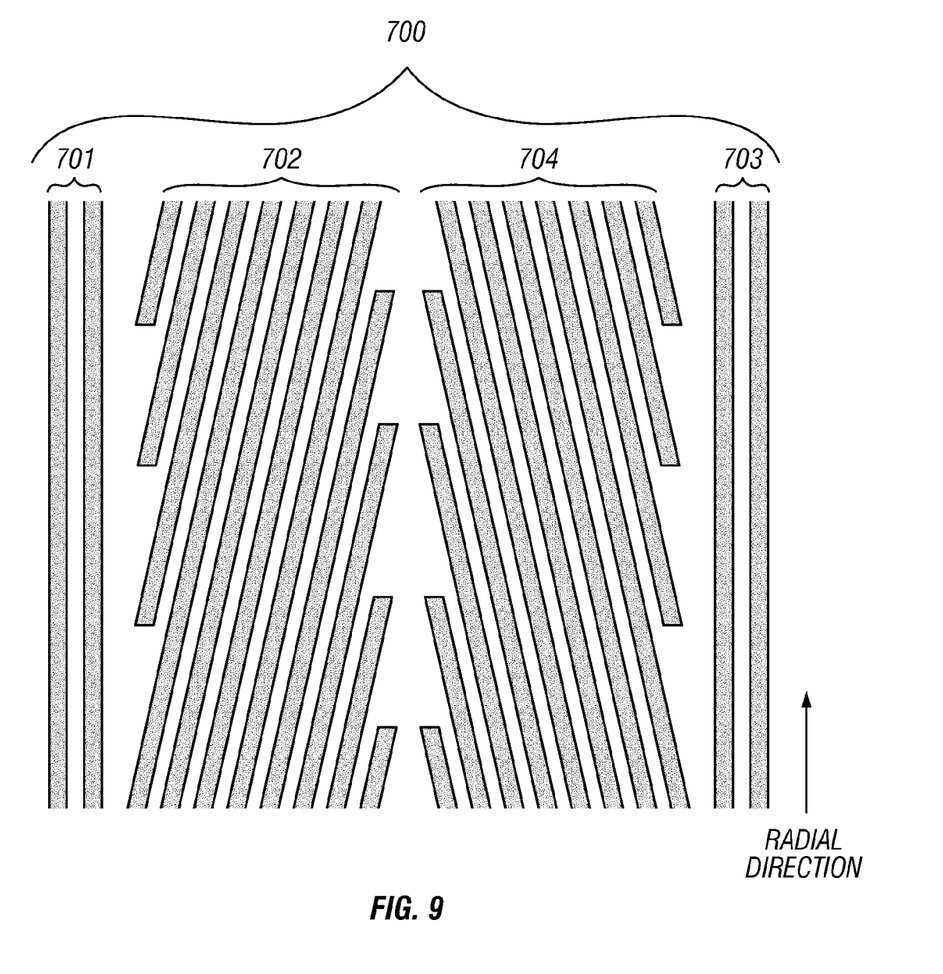
FIG. 9 is a view of a portion of a servo sector according to this invention with substantially symmetric servo fields for use with a phase-based servo system (also called a timing-based servo system).

Another embodiment of servo sectors with substantially symmetric servo fields uses a phase-based servo system (also called a timing-based servo system), whose pattern is shown in FIG. 9. The PES field 700 includes two symmetric sets 702, 704 of generally slanted position marks extending generally radially across multiple tracks. Identical start-of-field (SOF) marks 701, 703 are located on respective ends of PES field 700 and extend radially across the tracks. The time from detection of a SOF mark to detection of a slanted position mark indicates the radial position of the head. This type of PES field is different from the conventional quad-burst PES field 60 in FIG. 2, and thus a different type of PES decoding system is used. The phase-based servo system and decoding method is well-known, as described for example in U.S. Pat.

Nos. 5,689,384; 5,923,272 and 5,930,065. In the embodiment of FIG. 9, the CYL fields can be encoded in additional patterns located before or after the sets 702, 704. Alternatively, the CYL fields can be encoded within the sets 702, 704 of slanted position marks by shifting pairs of position marks early or late relative to other position marks in the pattern, in a manner which does not affect the overall phase relationship between the position marks. An example of such encoding with timing-based patterns is described in the previously cited U.S. Pat. Nos. 5,923,272 and 5,930,065. Since this method of encoding a CYL field embeds only a single bit or a few bits within each servo sector, a complete reading of a complete CYL address requires several successive servo sectors.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk having a first generally planar surface, a second generally planar surface opposite the first disk surface, and a central axis perpendicular to said surfaces, the disk comprising:
    a plurality of servo sectors on the first surface and forming a pattern of lines angularly spaced about said axis and extending in a generally radial direction, each servo sector comprising a plurality of discrete blocks of magnetic material arranged in a plurality of fields including a sector identification (SID) field and a servo position error signal (PES) field angularly spaced from said SID field; and
    a plurality of servo sectors on the second surface forming a pattern identical to the pattern on said first surface.

2. The disk of claim 1 wherein each of the lines of said servo pattern on each of said surfaces are generally arcuate lines extending between radially inner and outer circles centered at said axis.

3. The disk of claim 1 wherein each of the lines of said servo pattern on each of said surfaces are generally radially straight lines extending between radially inner and outer circles centered at said axis.

4. The disk of claim 1 wherein each of said surfaces includes a layer of continuous magnetic material and said discrete blocks comprise magnetized blocks of said magnetic material.

5. The disk of claim 1 wherein each of said surfaces includes a plurality of concentric circular data tracks of magnetizable material and guard bands of non-magnetizable material centered at said axis, wherein radially adjacent data tracks are separated by a guard band.

6. The disk of claim 1 wherein each of said surfaces includes a plurality of concentric circular data tracks of discrete data islands of magnetizable material.

7. The disk of claim 1 wherein the fields include an automatic gain control (AGC) field and a track identification field (TID).

8. The disk of claim 1 wherein the fields are angularly spaced generally symmetric about the center of the servo sector, the SID field is a first SID field, the first of said angularly spaced fields is a first automatic gain control (AGC) field, the second of said fields is said first sector SID field, the next-to-last of said fields is a second SID field identical to said first SID field, the last of said fields is a second AGC field identical to said first AGC field, and the PES field is between said first and second SID fields.

9. The disk of claim 1 wherein the discrete blocks in each servo sector are magnetized generally parallel to the surface on which they are formed.

10. The disk of claim 1 wherein the discrete blocks in each servo sector are magnetized generally perpendicular to the surface on which they are formed.

11. A magnetic recording disk having a first generally planar surface, a second generally planar surface opposite the first disk surface, and a central axis perpendicular to said surfaces, the disk comprising:
    a plurality of generally concentric circular data tracks of magnetic material on each of said surfaces, the data tracks being centered about said axis;
    a plurality of servo sectors on the first surface and forming a pattern of lines angularly spaced about said axis and extending in a generally radial direction across said data tracks, each servo sector comprising a plurality of discrete blocks of magnetic material, the blocks being arranged in angularly spaced fields along the data tracks, said fields being generally symmetric about the center of the servo sector and including a first field, a second field identical to said first field, and a servo position error signal (PES) field between said first and second identical fields; and
    a plurality of servo sectors on the second surface forming a pattern identical to the pattern on said first surface.

12. The disk of claim 11 wherein each of the lines of said servo pattern on each of said surfaces are generally arcuate lines extending between radially inner and outer circles centered at said axis.

13. The disk of claim 11 wherein each of the lines of said servo pattern on each of said surfaces are generally radially straight lines extending between radially inner and outer circles centered at said axis.

14. The disk of claim 11 wherein each of said discrete blocks comprise magnetized blocks of said magnetic material.

15. The disk of claim 11 wherein radially adjacent data tracks are separated by guard bands of non-magnetizable material.

16. The disk of claim 11 wherein said first and second identical fields are first and second identical sector identification (SID) fields, wherein the angularly spaced fields include a first automatic gain control (AGC) field and a second AGC field identical to said first AGC field, and wherein said first and second SID fields and said PES field are between said first and second AGC fields.

17. A magnetic recording disk drive comprising:
    a rotatable magnetic recording disk having a front generally planar surface, a back generally planar surface opposite the front disk surface, and a central axis of rotation perpendicular to said surfaces, the disk comprising a plurality of generally concentric circular data tracks of magnetic material on each of said surfaces, the data tracks being centered about said axis; a plurality of servo sectors on the front surface and forming a pattern of generally arcuate lines angularly spaced about said axis and extending in a generally radial direction across said data tracks between radially inner and outer circles centered at said axis, each servo sector comprising a plurality of discrete blocks of magnetic material, the blocks being arranged in angularly spaced fields along the data tracks, one of said fields being a position error signal (PES) field; and a plurality of servo sectors on the back surface forming a pattern of lines identical to the pattern of lines on said front surface;

a first head that detects the servo sectors on the front surface;

a second head that detects the servo sectors on the back surface;

an actuator connected to the heads for positioning the heads to different data tracks and maintaining the heads on the data tracks;

a servo control system coupled to the heads and the actuator, the servo control system including a processor for allowing detection of the PES fields during a specified time window and for generating an actuator control signal in response to detection of the PES fields by the heads; and memory coupled to the processor and containing a program of instructions readable by the processor, the program of instructions undertaking the method acts comprising estimating the radial position of the heads, calculating a time adjustment from the estimated position only when the PES fields are detected by said second head, and adjusting the time window using the calculated time adjustment.

18. A magnetic recording disk drive comprising:

a rotatable magnetic recording disk having a front generally planar surface, a back generally planar surface opposite the front disk surface, and a central axis of rotation perpendicular to said surfaces, the disk comprising a plurality of generally concentric circular data tracks of magnetic material on each of said surfaces, the data tracks being centered about said axis; a plurality of servo sectors on the front surface and forming a pattern of generally radially straight lines angularly spaced about said axis and extending in a generally radial direction across said data tracks between radially inner and outer circles centered at said axis, each servo sector comprising a plurality of discrete blocks of magnetic material, the blocks being arranged in angularly spaced fields along the data tracks, one of said fields being a position error signal (PES) field; and a plurality of servo sectors on the back surface forming a pattern of lines identical to the pattern of lines on said front surface;

a first head that detects the servo sectors on the front surface;

a second head that detects the servo sectors on the back surface;

an actuator connected to the heads for positioning the heads to different data tracks and maintaining the heads on the data tracks;

a servo control system coupled to the heads and the actuator, the servo control system including a processor for allowing detection of the PES fields during a specified time window and for generating an actuator control signal in response to detection of the PES fields by the heads; and memory coupled to the processor and containing a program of instructions readable by the processor, the program of instructions undertaking the method acts comprising estimating the radial position of the heads, calculating a time adjustment from the estimated position when the PES fields are detected by said first head and when the PES fields are detected by said second head, and adjusting the time window using the calculated time adjustment.

* * * * *